United States Patent
Kosaka et al.

(10) Patent No.: US 9,915,342 B2
(45) Date of Patent: Mar. 13, 2018

(54) CONTROL APPARATUS AND CONTROL METHOD FOR AUTOMATIC TRANSMISSION

(71) Applicant: Toyota Jidosha Kabushiki Kaisha, Toyota-shi (JP)

(72) Inventors: Koshiro Kosaka, Nagakute (JP); Seiji Kuwahara, Susono (JP); Takahiro Kondo, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 340 days.

(21) Appl. No.: 14/753,754

(22) Filed: Jun. 29, 2015

(65) Prior Publication Data

US 2015/0377349 A1 Dec. 31, 2015

(30) Foreign Application Priority Data

Jun. 30, 2014 (JP) ................................. 2014-134538

(51) Int. Cl.
| | |
|---|---|
| *F16H 59/18* | (2006.01) |
| *F16H 61/10* | (2006.01) |
| *F16H 59/70* | (2006.01) |
| *F16H 59/36* | (2006.01) |

(52) U.S. Cl.
CPC ............ *F16H 61/10* (2013.01); *F16H 59/18* (2013.01); *F16H 59/70* (2013.01); *F16H 2059/366* (2013.01)

(58) Field of Classification Search
CPC .......... F16H 61/10; F16H 59/18; F16H 59/70; F16H 2306/14
See application file for complete search history.

(56) References Cited

U.S. PATENT DOCUMENTS

| | | | | |
|---|---|---|---|---|
| 2005/0143221 | A1* | 6/2005 | Kuwahara | F16H 61/0213 477/97 |
| 2006/0178796 | A1* | 8/2006 | Kuwahara | F16H 61/0213 701/51 |
| 2010/0137101 | A1* | 6/2010 | Jeon | F16H 61/0437 477/84 |

(Continued)

FOREIGN PATENT DOCUMENTS

| | | |
|---|---|---|
| EP | 1 674 755 A2 | 6/2006 |
| JP | 2006-183765 A | 7/2006 |

(Continued)

*Primary Examiner* — Huan Le
(74) *Attorney, Agent, or Firm* — Oblon, McClelland, Maier & Neustadt, L.L.P.

(57) ABSTRACT

A control apparatus for an automatic transmission includes an ECU. The ECU stores a N−1 speed downshift/a N−2 speed downshift/a N−1 speed upshift/and a hysteresis lines. The hysteresis line is a predetermined distance above the N−1 speed upshift line, and is below the N−2 speed downshift line. The ECU controls the speed of the automatic transmission based on a quantity of state of a vehicle, and the plurality of stored shift lines, and execute, when an N speed is established, a first downshift that changes a speed from the N speed to an N−2 speed, when the quantity of state of the vehicle is in a region above the hysteresis line, after the quantity of state of the vehicle has risen above the N−1 speed downshift line.

8 Claims, 4 Drawing Sheets

(56) References Cited

U.S. PATENT DOCUMENTS

| | | | |
|---|---|---|---|
| 2010/0197457 A1* | 8/2010 | Kuwahara | F02D 11/105 477/107 |
| 2011/0130928 A1* | 6/2011 | Matsunaga | F16H 61/10 701/52 |
| 2014/0214288 A1 | 7/2014 | Tokura et al. | |

FOREIGN PATENT DOCUMENTS

| JP | 2008-240561 | 10/2008 |
|---|---|---|
| JP | 2010-270897 A | 12/2010 |
| JP | 2013-87782 A | 5/2013 |

\* cited by examiner

CONTROL APPARATUS AND CONTROL METHOD FOR AUTOMATIC TRANSMISSION

INCORPORATION BY REFERENCE

The disclosure of Japanese Patent Application No. 2014-134538 filed on Jun. 30, 2014 including the specification, drawings and abstract is incorporated herein by reference in its entirety.

BACKGROUND OF THE INVENTION

1. Field of the Invention

The invention relates to a control apparatus and a control method for an automatic transmission.

2. Description of Related Art

An automatic transmission is configured to selectively establish any one of a plurality of speeds. The speed of the automatic transmission is automatically controlled based on a shift map stored in advance, and a quantity of state of a vehicle in which the automatic transmission is mounted. The quantity of state of the vehicle is a quantity of state that is typically indicated by an accelerator operation amount and vehicle speed as parameters. The shift map is a plurality of upshift lines and a plurality of downshift lines both corresponding to a plurality of speeds, for example.

Japanese Patent Application Publication No. 2008-240561 (JP 2008-240561 A) describes an automatic transmission capable of establishing six speeds. i.e., 1st speed to 6th speed, which executes a downshift from N speed (where N is a natural number of 3 of higher) into a speed two or more speeds lower, by skipping N−1 speed that is one speed lower (that has a larger speed ratio). Hereinafter, this type of downshift may also be referred to as a "skip downshift" or a "first downshift".

When a skip downshift from N speed into N−2 speed is executed, a downshift line obtained by temporarily superimposing a downshift line for changing from N speed to N−1 speed (hereinafter referred to as a "N−1 speed downshift line") and a downshift line for changing from N−1 speed to N−2 speed (hereinafter referred to as a "N−2 speed downshift line") is hypothetically created as a skip downshift line for changing from N speed to N−2 speed (hereinafter referred to as a "N−2 speed skip downshift line"), and a skip downshift from N speed into N−2 speed is executed after the quantity of state of the vehicle changes from being below the N−2 speed skip downshift line to above the N−2 speed skip downshift line.

SUMMARY OF THE INVENTION

However, when executing the skip downshift from N speed into N−2 speed, an upshift line for changing from N−2 speed to N−1 speed (hereinafter referred to as a "N−1 speed upshift line") is not changed. Therefore, there is a possibility that a phenomenon in which the N−2 speed skip downshift line and the N−1 speed upshift line do not match up, and immediately after a skip downshift from N speed into N−2 speed, the quantity of state of the vehicle ends up falling below the N−1 speed upshift line and an upshift from N−2 speed into N−1 speed is executed (a so-called "busy shift") may occur.

The invention thus provides a control apparatus and a control method for an automatic transmission that suppress a busy shift after a skip downshift.

A first aspect of the invention relates to a control apparatus for an automatic transmission that includes a plurality of speeds and is configured such that any one of the plurality of speeds is selectively established. The automatic transmission is mounted on a vehicle. The control apparatus includes an electronic control unit that is configured to store a plurality of shift lines, the plurality of shift lines including an N−1 speed downshift line, an N−2 speed downshift line, an N−1 speed upshift line, and a hysteresis line. N is a natural number of 3 or higher. The N−1 speed downshift line is a shift line used to determine whether to change from an N speed to an N−1 speed, the N−2 speed downshift line is a shift line used to determine whether to change from the N−1 speed to an N−2 speed, the N−1 speed upshift line is a shift line used to determine whether to change from the N−2 speed to the N−1 speed, and the hysteresis line is a line that is a predetermined distance above the N−1 speed upshift line, and is below the N−2 speed downshift line. The electronic control unit is configured to control the speed of the automatic transmission based on a quantity of state of the vehicle, and the plurality of stored shift lines. The electronic control unit is configured to execute a first downshift that changes a speed from the N speed to the N−2 speed, when the N speed is established and the quantity of state of the vehicle is in a region above the hysteresis line after the quantity of state of the vehicle has risen above the N−1 speed downshift line.

With this kind of structure, the first downshift into the N−2 speed is executed when the N speed is established and the quantity of state of the vehicle is above the hysteresis line after the quantity of state of the vehicle has risen above the N−1 speed downshift line. Here, the hysteresis line is a predetermined distance above the N−speed upshift line. Therefore, an upshift into the N−1 speed immediately after the first downshift into the N−2 speed (i.e., a busy shift after the first downshift) is able to be inhibited.

In the control apparatus described above, the electronic control unit may be configured to, when the N speed is established, execute the first downshift when the quantity of state of the vehicle is in a region above the hysteresis line, and a difference between an estimated value of vehicle driving force when the speed is changed to the N−2 speed and an estimated value of vehicle driving force when the speed is changed to the N−1 speed is less than a predetermined value, after the quantity of state of the vehicle has risen above the N−1 speed downshift line.

With this kind of structure, the first downshift is not always executed when the quantity of state of the vehicle is above the hysteresis line after rising above the N−1 speed downshift line. The first downshift into the N−2 speed is executed when the difference between an estimated value of vehicle driving force when the speed has changed to the N−2 speed, and an estimated value of vehicle driving force when the speed has changed to the N−1 speed is less than a predetermined value. When the difference between the estimated value of vehicle driving force when the speed has changed to the N−2 speed, and the estimated value of vehicle driving force when the speed has changed to the N−1 speed is less than the predetermined value is when it is highly likely that, even if a second downshift into the N−1 speed has been performed, a second downshift into the N−2 speed will be performed immediately thereafter. Therefore, a downshift into the N−2 speed is able to be appropriately inhibited from being performed immediately after a downshift into the N−1 speed.

In the control apparatus described above, the automatic transmission may be connected to an engine via an input shaft of the automatic transmission. The electronic control unit may be configured to, when the N speed is established, execute the first downshift when the quantity of state of the vehicle is in a first region that is above the hysteresis line, and below a maximum N−1 speed downshift line, after the quantity of state of the vehicle has risen above the N−1 speed downshift line. The maximum N−1 speed downshift line is a line in which the N−1 speed downshift line is expanded upward to the maximum extent possible so as to maintain the current N speed until a user required output reaches a value corresponding to maximum output of the engine.

With this kind of structure, the first downshift is executed when the quantity of state of the vehicle is in the first region. Here, the first region is a region that is above the hysteresis line and below the maximum N−1 speed downshift line. The region below the maximum N−1 speed downshift line is a region in which the user required output will not reach a value corresponding to the maximum output of the engine in the current N speed, but in which engine output is able to be increased according to an increase in the user required output even if the current N speed is maintained. Therefore, an area where engine output is undetected is able to be prevented from being created before the first downshift, while a busy shift is able to be inhibited after the first downshift. The undetectable area refers to a state in which engine output will not increase even though the user required output is being increased.

In the control apparatus described above, the electronic control unit may be configured to, when the N speed is established, execute the first downshift when the quantity of state of the vehicle is in the first region, and a difference between an estimated value of vehicle driving force when the speed is changed to the N−2 speed and an estimated value of vehicle driving force when the speed is changed to the N−1 speed is less than a predetermined value, after the quantity of state of the vehicle has risen above the N−1 speed downshift line.

With this kind of structure, the first downshift is not always executed when the quantity of state of the vehicle is in the first region after rising above the N−1 speed downshift line. The first downshift into the N−2 speed is executed when the difference between the estimated value of vehicle driving force when the speed has changed to the N−2 speed, and the estimated value of vehicle driving force when the speed has changed to the N−1 speed is less than the predetermined value. When the difference between the estimated value of vehicle driving force when the speed has changed to the N−2 speed, and the estimated value of vehicle driving force when the speed has changed to the N−1 speed is less than the predetermined value, is when it is highly likely that, even if a second downshift into the N−1 speed has been performed, a second downshift into the N−2 speed will be performed immediately thereafter. Therefore, a downshift into the N−2 speed is able to be appropriately inhibited from being performed immediately after a downshift into the N−1 speed.

In the control apparatus described above, the electronic control unit may be configured to maintain the current N speed until a period of time for which the quantity of state of the vehicle is maintained in a second region exceeds a predetermined period of time when the N speed is established and the quantity of state of the vehicle is in the second region after the quantity of state of the vehicle has risen above the N−1 speed downshift line, the second region is a region that is below the hysteresis line and below the maximum N−1 speed downshift line. The electronic control unit may be configured to execute a second downshift that changes the speed from the N speed to the N−1 speed when the period of time for which the quantity of state of the vehicle is maintained in the second region exceeds the predetermined period of time.

With this kind of structure, the second region is a region that is below the hysteresis line, as well as below the maximum N−1 speed downshift line. Therefore, when a first downshift is performed when the quantity of state of the vehicle is in the second region, there is a possibility that an upshift into N−1 speed will end up being executed immediately after the first downshift is performed, but on the other hand, the output of the engine is able to be increased even if the current N speed is maintained. Therefore, the electronic control unit allows the current N speed to be maintained until the period of time for which the quantity of state of the vehicle is maintained in the second region exceeds the predetermined period of time. As a result, the first downshift is still able to be executed, while satisfying the user required output. Also, when the period of time for which the quantity of state of the vehicle is maintained in the second region exceeds the predetermined period of time, the electronic control unit executes the second downshift that changes the speed from the N speed to the N−1 speed. As a result, fuel efficiency is able to be inhibited from deteriorating.

In the control apparatus described above, the electronic control unit may be configured to, when the N speed is established and the quantity of state of the vehicle is in a second region that is below the hysteresis line and below the maximum N−1 speed downshift line, after the quantity of state of the vehicle has risen above the N−1 speed downshift line, maintain the current N speed when an increase rate of an accelerator operation amount is smaller than a predetermined rate. The electronic control unit may be configured to execute the first downshift when the increase rate of the accelerator operation amount is greater than the predetermined rate.

In the control apparatus described above, the electronic control unit may be configured to, when the N speed is established and the quantity of state of the vehicle is in the second region, after the quantity of state of the vehicle has risen above the N−1 speed downshift line, maintain the current N speed when the period of time for which the quantity of state of the vehicle is maintained in the second region has not exceeded the predetermined period of time and the increase rate of the accelerator operation amount is smaller than the predetermined rate. The electronic control unit may be configured to execute the first downshift when the period of time for which the quantity of state of the vehicle is maintained in the second region has not exceeded the predetermined period of time and the increase rate of the accelerator operation amount is greater than the predetermined rate. The electronic control unit may be configured to execute a second downshift that changes the speed from the N speed to the N−1 speed when the period of time for which the quantity of state of the vehicle is maintained in the second region exceeds the predetermined period of time.

With these kinds of structures, the first downshift into the N−2 speed is executed when the increase rate of the accelerator operation amount is greater than the predetermined rate, even if the quantity of state of the vehicle is in the second region after the quantity of state of the vehicle has risen above the N−1 speed downshift line. When, even if the quantity of state of the vehicle is in the second region after the quantity of state of the vehicle has risen above the N−1 speed downshift line, the increase rate of the accelerator operation amount is greater than the predetermined rate, is when, even if a second downshift into the N−1 speed has been performed, it is highly likely that a second downshift into the N−2 speed will be performed immediately thereafter. Therefore, a downshift into the N−2 speed is able to be appropriately inhibited from being performed immediately after a downshift into the N−1 speed.

A second aspect of the invention provides a control method for an automatic transmission that includes a plurality of speeds and is configured such that any one of the plurality of speeds is selectively established. The automatic transmission is mounted on a vehicle. The control method includes: storing a plurality of shift lines, the plurality of shift lines including an N−1 speed downshift line, an N−2 speed downshift line, an N−1 speed upshift line, and a hysteresis line. N is a natural number of 3 or higher. The N−1 speed downshift line is a shift line used to determine whether to change from an N speed to an N−1 speed, the N−2 speed downshift line is a shift line used to determine whether to change from the N−1 speed to an N−2 speed, the N−1 speed upshift line is a shift line used to determine whether to change from the N−2 speed to the N−1 speed, and the hysteresis line is a line that is a predetermined distance above the N−1 speed upshift line, and the hysteresis line is below the N−2 speed downshift line; controlling the speed of the automatic transmission based on a quantity of state of the vehicle, and the plurality of stored shift lines; executing a first downshift that changes a speed from the N speed to the N−2 speed, when the N speed is established and the quantity of state of the vehicle is in a region above the hysteresis line, after the quantity of state of the vehicle has risen above the N−1 speed downshift line.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings. Like or corresponding portions in the drawings will be denoted by like reference characters, and descriptions thereof will not be repeated.

Figure 1:
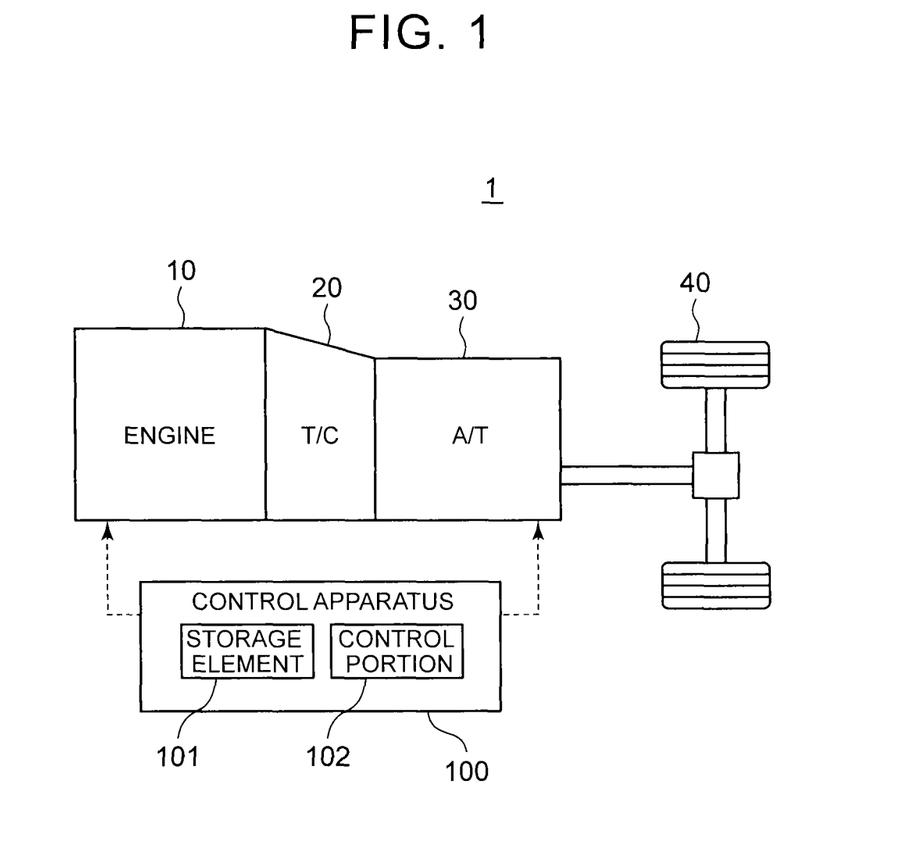
FIG. 1 is an overall block diagram of a vehicle.

FIG. 1 is an overall block diagram of a vehicle 1 according to one example embodiment of the invention. The vehicle 1 includes an engine 10, a torque converter 20, an automatic transmission 30, driving wheels 40, and an electronic control unit 100.

The engine 10 is an internal combustion engine such as a gasoline engine or a diesel engine. The engine 10 is connected to the automatic transmission 30 via the torque converter 20. An output shaft of the automatic transmission 30 is connected to the driving wheels 40.

The automatic transmission 30 is a stepped automatic transmission configured to be able to selectively establish any one of a plurality of speeds each having a different speed ratio (the ratio of the input shaft rotation speed with respect to the output shaft rotation speed).

Although not shown, the vehicle 1 is provided with a plurality of sensors for detecting various physical quantities required to control the vehicle 1, such as an accelerator operation amount (an accelerator pedal operation amount by a user), engine speed, and vehicle speed. These sensors output the detection results to the electronic control unit 100.

The electronic control unit 100 includes a storage element 101 and a control portion 102. Various information necessary to control the vehicle 1 is stored in advance in the storage element 101. The control portion 102 executes predetermined calculations based on information from the various sensors, not shown, and the information stored in the storage element 101, and controls various devices in the vehicle 1 based on the calculation results.

A plurality of shift lines (i.e., a plurality of downshift lines and a plurality of upshift lines) used to determine whether to change the speed of the automatic transmission 30 are stored in the storage element 101. For example, if the automatic transmission 30 is able to establish eight speeds, i.e., 1st speed to 8th speed, seven upshift lines and seven downshift lines are stored in the storage element 101. The seven upshift lines include a 2nd speed upshift line used to determine whether to upshift from 1st speed to 2nd speed, a 3rd speed upshift line used to determine whether to upshift from 2nd speed to 3rd speed, and so on up to an 8th speed upshift line used to determine whether to upshift from 7th speed to 8th speed. The seven downshift lines include a 7th speed downshift line used to determine whether to downshift from 8th speed to 7th speed, a 6th speed downshift line used to determine whether to downshift from 7th speed to 6th speed, and so on down to a 1st speed downshift line used to determine whether to downshift from 2nd speed to 1st speed.

The control portion 102 controls the speed of the automatic transmission 30 based on the relationship between the quantity of state of the vehicle indicated by the accelerator operation amount and the vehicle speed as parameters, and the shift lines stored in the storage element 101.

In the description below, when an N speed (where N is a natural number of 3 or higher) is established, the downshift line used to determine whether to downshift from the current N speed to N−1 speed will be referred to as a "N−1 speed downshift line", the downshift line used to determine whether to downshift from N−1 speed to N−2 speed will be referred to as a "N−2 speed downshift line", and the upshift line used to determine whether to upshift from N−2 speed to N−1 speed will be referred to as a "N−1 speed upshift line".

In the vehicle 1 having this kind of structure, when N speed is established, the control portion 102 executes downshift control to change to a speed lower than (with a higher speed ratio than) N speed, when the quantity of state of the vehicle has risen from below the N−1 speed downshift line to above than the N−1 speed downshift line. At this time, the control portion 102 either executes a normal downshift from N speed into N−1 speed (hereinafter also referred to as a "second downshift"), or executes a downshift from N speed into N−2 speed (hereinafter also referred to as a "first downshift"), according to the quantity of state of the vehicle after the quantity of state of the vehicle has risen above the N−1 speed downshift line (hereinafter also referred to as "after a N−1 speed downshift determination").

Figure 2:
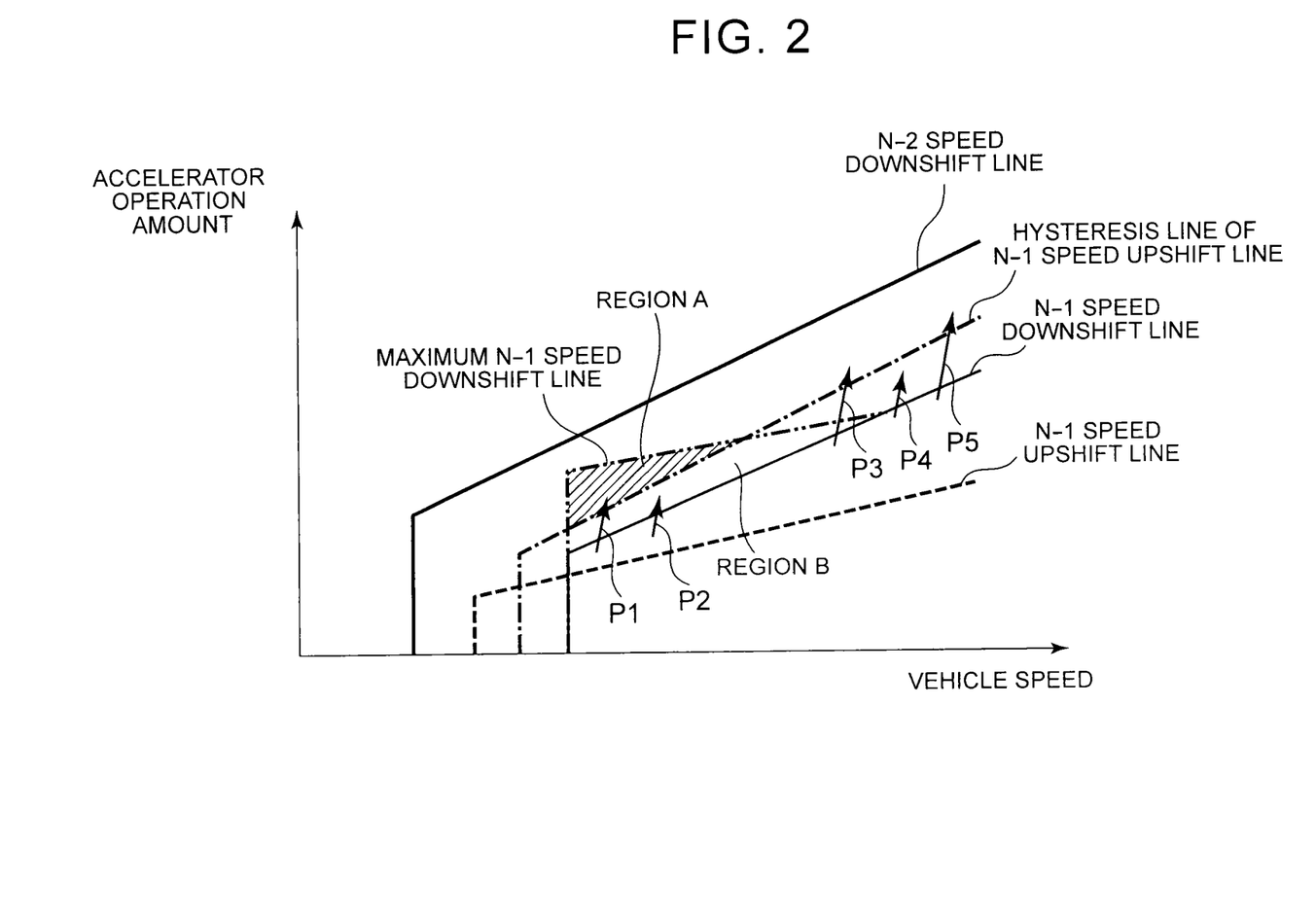
FIG. 2 is a view showing, by way of example, the relationship between an N−1 speed downshift line, an N−2 speed downshift line, an N−1 speed upshift line, a hysteresis line of the N−1 speed upshift line, and a maximum N−1 speed downshift line.

FIG. 2 is a view showing, by way of example, the relationship between the N–1 speed downshift line, the N–2 speed downshift line, the N–1 speed upshift line, a hysteresis line of the N–1 speed upshift line, and a maximum N–1 speed downshift line. A method by which the control portion 102 determines whether to execute a second downshift or a first downshift will be described with reference to FIG. 2.

First, the hysteresis line of the N–1 speed upshift line, the maximum N–1 speed downshift line, a region A, and a region B shown in FIG. 2 will be described.

The hysteresis line of the N–1 speed upshift line (hereinafter, also simply referred to as "hysteresis line"; see the alternate long and short dash line in FIG. 2) is a line that is a predetermined distance above the N–1 speed upshift line (see the broken line in FIG. 2). Hereinafter, the region above the hysteresis line of the N–1 speed upshift line and below the N–2 speed downshift line will be referred to as the "hysteresis region of the N–1 speed upshift line" or simply the "hysteresis region". In this example embodiment, the hysteresis line (the hysteresis region) is stored in advance in the storage element 101 for each speed. The hysteresis line (the hysteresis region) does not necessarily have to be fixed, and may fluctuate according to the quantity of state of the vehicle, for example.

The maximum N–1 speed downshift line (see the chain double-dashed line in FIG. 2) is a line in which the N–1 speed downshift line is expanded upward to the maximum extent possible so as to maintain the current N speed until a user required output determined according to the accelerator operation amount and the like reaches a value corresponding to maximum output of the engine 10. Hereinafter, the user required output reaching the value corresponding to maximum output of the engine 10 may also be referred to as the output of the engine 10 being saturated. In this example embodiment, the maximum N–1 speed downshift line is stored in advance in the storage element 101 for each speed. The maximum N–1 speed downshift line does not necessarily have to be fixed, and may fluctuate according to the quantity of state of the vehicle, for example.

Figure 3:
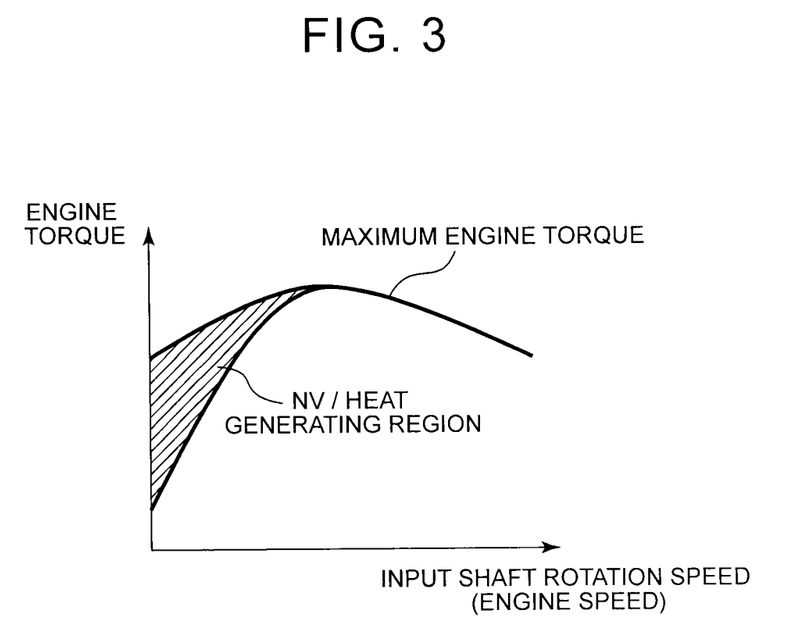
FIG. 3 is a view showing the relationship between input shaft rotation speed (a rotation speed corresponding to the engine speed) of the automatic transmission, and maximum engine torque.

FIG. 3 is a view showing the relationship between input shaft rotation speed (a rotation speed corresponding to the engine speed) of the automatic transmission 30, and maximum engine torque. In the region exceeding maximum engine torque shown in FIG. 3, the output of the engine 10 is saturated, and an area where the output of the engine 10 is undetectable (i.e., a state in which the output of the engine 10 does not increase even though the user required output is increasing) is created. Also, in a NV/heat generating region shown in FIG. 3, large NV (noise and vibration) or heat tend to be generated even though the output of the engine 10 is not saturated. The maximum N–1 speed downshift line is a line in which the N–1 speed downshift line is expanded upward to the maximum extent possible so as to maintain the current N speed until right before the user required output reaches either the region exceeding the maximum engine torque shown in FIG. 3, or the NV/heat generating region.

Returning now to FIG. 2, region A is a region above the hysteresis line of the N–1 speed upshift line and below the maximum N–1 speed downshift line. Region B is a region that is below both the hysteresis line of the N–1 speed upshift line and the N–1 speed downshift line.

Next, a method by which the control portion 102 determines whether to execute a second downshift or whether to execute a first downshift will be described. As described above, when the N speed is established, the control portion 102 executes a downshift to change into a speed lower than N speed when the quantity of state of the vehicle (i.e., a point where the accelerator operation amount and the vehicle speed cross in FIG. 2) rises from below the N–1 speed downshift line (the lower side in FIG. 2) to above the N–1 speed downshift line (the upper side in FIG. 2), according to an increase in the accelerator operation amount and the like.

At this time, if the quantity of state of the vehicle after the quantity of state of the vehicle has risen above the N–1 speed downshift line (i.e., after the N–1 speed downshift determination) is in region A in FIG. 2 (see arrow P1 in FIG. 2), the control portion 102 allows a first downshift from N speed into N–2 speed to be executed.

Here, region A is the region above the hysteresis line of the N–1 speed upshift line (which is a line a predetermined distance above the N–1 speed upshift line), as described above. Therefore, an upshift into N–1 speed immediately after the first downshift into N–2 speed (i.e., a busy shift after the first downshift) is able to be inhibited.

Moreover, region A is a region below the maximum N–1 speed downshift line. That is, region A is a region in which the user required output will not reach a value corresponding to the maximum output of the engine 10, but the output of the engine 10 is able to be increased according to an increase in the user required output even if the current N speed is maintained. Therefore, an area where output of the engine 10 is undetected is able to be prevented from being created before the first downshift into N–2 speed.

If the quantity of state of the vehicle after the N–1 speed downshift determination is in region B in FIG. 2 (see arrow P2 in FIG. 2), the control portion 102 allows the current N speed to be maintained until the time for which the quantity of state of the vehicle is maintained in region B exceeds a predetermined period of time.

Region B is a region that is below both the hysteresis line of the N–1 speed upshift line (which is a line a predetermined distance above the N–1 speed upshift line) and the maximum N–1 speed downshift line, as described above. Therefore, if the quantity of state of the vehicle is in region B, there is a possibility that an upshift into N–1 speed will end up being executed immediately after the first downshift is performed, but on the other hand, the output of the engine 10 is able to be increased according to an increase in the user required output even if the current N speed is maintained.

Therefore, the control portion 102 allows the current N speed to be maintained until the time for which the quantity of state of the vehicle is maintained in region B in FIG. 2 exceeds the predetermined period of time. As a result, the first downshift into N–2 speed is still able to be executed while satisfying the user required output. That is, the first downshift into N–2 speed is able to be executed when the quantity of state of the vehicle enters region A before the predetermined period of time passes.

On the other hand, if the quantity of state of the vehicle is maintained in region B even after the predetermined period of time has passed, the control portion 102 executes the second downshift into N–1 speed at the point when the predetermined period of time passes. As a result, fuel efficiency is able to be inhibited from deteriorating.

In this example embodiment, even if the quantity of state of the vehicle after the N–1 speed downshift determination is in region B in FIG. 2, if an accelerator operation increase rate (i.e., the amount of increase in the accelerator operation amount per unit time) is larger than a predetermined rate, the user is requesting large acceleration and it is predicted that the quantity of increase in the vehicle will soon be above the N–2 speed downshift line, so the control portion 102 allows the first downshift into the N−2 speed to be executed. As a result, a shift according to the demand of the user is able to be performed.

When the quantity of state of the vehicle after the N−1 speed downshift determination is neither in region A nor region B shown in FIG. 2 (see arrows P3, P4, and P5 in FIG. 2), the control portion 102 executes the second downshift into N−1 speed.

Figure 4:
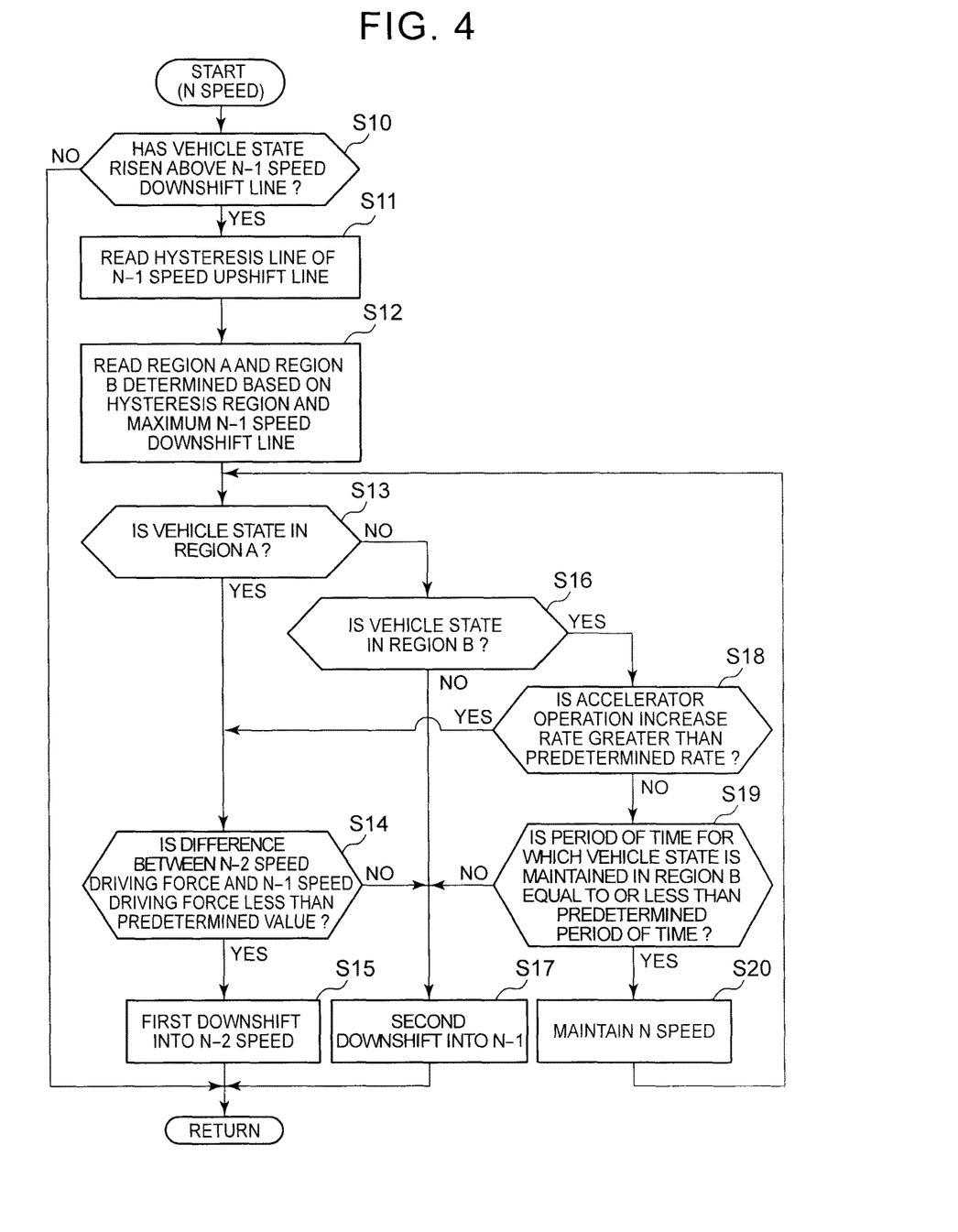
FIG. 4 is a flowchart illustrating a flow in a routine of a control portion.

FIG. 4 is a flowchart illustrating the flow in a downshift control routine performed by the control portion 102. The routine in this flowchart is repeatedly executed in predetermined cycles when N speed is established.

In step S10, the control portion 102 determines whether the quantity of state of the vehicle has risen above the N−1 speed downshift line.

If the quantity of state of the vehicle has risen above the N−1 speed downshift line (i.e., YES in step S10), the control portion 102 reads the hysteresis region with the N−1 speed upshift line (see FIG. 2 described above) from the storage element 101 in step S11.

Then in step S12, the control portion 102 reads region A and region B determined based on the hysteresis region with the N−1 speed upshift line and the maximum N−1 speed downshift line (see FIG. 2 described above).

Next, in step S13, the control portion 102 determines whether the quantity of state of the vehicle after the quantity of state of the vehicle has risen above the N−1 speed downshift line (after the N−1 speed downshift determination) is in region A.

If the quantity of state of the vehicle after the N−1 speed downshift determination is in region A (i.e., YES in step S13), the control portion 102 determines whether a difference between a N−2 speed driving force and a N−1 speed driving force is less than a predetermined value in step S14.

Here, the N−2 speed driving force is an estimated value of vehicle driving force when it is supposed that the first downshift from the current N speed into N−2 speed has been executed with the current quantity of state of the vehicle. The N−1 speed driving force is an estimated value of vehicle driving force when it is supposed that the second downshift from the current N speed into N−1 speed has been executed with the current quantity of state of the vehicle.

If the difference between the N−2 speed driving force and the N−1 speed driving force is less than the predetermined value (i.e., YES in step S14), the control portion 102 executes the first downshift into N−2 speed in step S15. On the other hand, if the difference between the N−2 speed driving force and the N−1 speed driving force is equal to or greater than the predetermined value (i.e., NO in step S14), the control portion 102 executes the second downshift into N−1 speed in step S17.

That is, the control portion 102 according to this example embodiment allows the first downshift to be executed when the quantity of state of the vehicle after the N−1 speed downshift determination is in region A, but does not always execute the first downshift. The control portion 102 executes the first downshift into N−2 speed when the difference between the N−2 speed driving force and the N−1 speed driving force is less than the predetermined value. When the difference between the N−2 speed driving force and the N−1 speed driving force is less than the predetermined value is when it is highly likely that, even if the second downshift into N−1 speed has been performed, a second downshift into N−2 speed will be performed immediately thereafter. Therefore, a downshift into N−2 speed is able to be appropriately inhibited from being performed immediately after a downshift into N−1 speed.

The difference between the N−2 speed driving force and the N−1 speed driving force may change according to not only the current quantity of state of the vehicle, but also the value of N speed that is currently established. Therefore, for example, even if the quantity of state of the vehicle (i.e., the accelerator operation amount and the vehicle speed) is the same, a first downshift may be executed, or a second downshift may be executed, depending on the current value of the N speed. For example, even if the quantity of state of the vehicle (i.e., the accelerator operation amount and the vehicle speed) is the same, when the current N speed is 7th speed, the difference between the 5th speed driving force and the 6th speed driving force may become less than the predetermined value and a first downshift into 5th speed may be executed, and when the current N speed is 5th speed, the difference between the 3rd speed driving force and the 4th speed driving force may become greater than the predetermined value and a second downshift into 4th speed may be executed.

If the quantity of state of the vehicle after the N−1 speed downshift determination is not in region A (i.e., NO in step S13), the control portion 102 then determines in step S16 whether the quantity of state of the vehicle after the N−1 speed downshift determination is in region B. If the quantity of state of the vehicle is not in region B (i.e., NO in step S16), then the process proceeds on to step S17 where the control portion 102 executes a second downshift into N−1 speed.

On the other hand, if the quantity of state of the vehicle is in region B (i.e., YES in step S16), the control portion 102 then determines in step S18 whether an accelerator operation increase rate (i.e., the amount of increase in the accelerator operation amount per unit time) is greater than a predetermined rate.

If the accelerator operation increase rate is greater than the predetermined rate (i.e., YES in step S18), the process proceeds on to step S14 and the control portion 102 executes steps S14 and thereafter. Therefore, even if the quantity of state of the vehicle after the N−1 speed downshift determination is in region B, if the accelerator operation increase rate is greater than the predetermined rate, the control portion 102 executes a first downshift into N−2 speed on the condition that the difference between the N−2 speed driving force and the N−1 speed driving force be less than the predetermined value. When, even if the quantity of state of the vehicle after the N−1 speed downshift determination is in region B, the accelerator operation increase rate is greater than the predetermined rate, is when, even if the second downshift into N−1 speed has been performed, it is highly likely that a first downshift into N−2 speed will be performed immediately thereafter. Therefore, a downshift into N−2 speed is able to be appropriately inhibited from being performed immediately after a downshift into N−1 speed.

On the other hand, if the accelerator operation increase rate is smaller than the predetermined rate (i.e., NO in step S18), the control portion 102 then determines in step S19 whether a period of time for which the quantity of state of the vehicle after the N−1 speed downshift determination is maintained in region B is equal to or less than a predetermined period of time.

If the period of time for which the quantity of state of the vehicle after the N−1 speed downshift determination is maintained in region B is equal to or less than the predetermined period of time (i.e., YES in step S19), the control portion 102 maintains the current N speed (i.e., stands by in the current N speed). Then, the process returns to step S13 and the control portion 102 again executes steps S13 and thereafter. Therefore, even if the quantity of state of the vehicle after the N−1 speed downshift determination is in region B, if the quantity of state of the vehicle enters region A before the time for which the quantity of state of the vehicle after the N−1 speed downshift determination is maintained in region B exceeds the predetermined period of time, the control portion 102 executes a first downshift into N−2 speed on the condition that the difference between the N−2 speed driving force and the N−1 speed driving force be less than the predetermined value.

As described above, the control portion 102 according to this example embodiment allows a first downshift from N speed into N−2 speed to be executed when the quantity of state of the vehicle after the N−1 speed downshift determination is in region A. Region A is a region above the hysteresis line of the N−1 speed upshift line and below the maximum N−1 speed downshift line. Therefore, a busy shift after a first downshift can be inhibited.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A control apparatus for an automatic transmission, the automatic transmission including a plurality of speeds, the automatic transmission being configured such that any one of the plurality of speeds is selectively established, the automatic transmission being mounted on a vehicle, the control apparatus comprising:
    an electronic control unit configured to:
    (i) store a plurality of shift lines, the plurality of shift lines including an N−1 speed downshift line, an N−2 speed downshift line, an N−1 speed upshift line, and a hysteresis line, and N is a natural number of 3 or higher, the N−1 speed downshift line being a shift line used to determine whether to change from an N speed to an N−1 speed, the N−2 speed downshift line being a shift line used to determine whether to change from the N−1 speed to an N−2 speed, the N−1 speed upshift line being a shift line used to determine whether to change from the N−2 speed to the N−1 speed, and the hysteresis line being a line that is a predetermined distance above the N−1 speed upshift line, and the hysteresis line being below the N−2 speed downshift line;
    (ii) control the speed of the automatic transmission based on a quantity of state of the vehicle and the plurality of stored shift lines; and
    (iii) execute a first downshift that changes a speed from the N speed to the N−2 speed, when the N speed is established and the quantity of state of the vehicle is in a region above the hysteresis line after the quantity of state of the vehicle has risen above the N−1 speed downshift line.

2. The control apparatus according to claim 1, wherein the electronic control unit is configured to, when the N speed is established, execute the first downshift when the quantity of state of the vehicle is in the region above the hysteresis line, and a difference between an estimated value of vehicle driving force when the speed is changed to the N−2 speed and an estimated value of vehicle driving force when the speed is changed to the N−1 speed is less than a predetermined value, after the quantity of state of the vehicle has risen above the N−1 speed downshift line.

3. The control apparatus according to claim 1, wherein the automatic transmission is connected to an engine via an input shaft of the automatic transmission, and
    the electronic control unit is configured to, when the N speed is established, execute the first downshift when the quantity of state of the vehicle is in a first region that is above the hysteresis line, and below a maximum N−1 speed downshift line, after the quantity of state of the vehicle has risen above the N−1 speed downshift line, and
    the maximum N−1 speed downshift line being a line in which the N−1 speed downshift line is expanded upward to the maximum extent possible so as to maintain a current N speed until a user required output reaches a value corresponding to maximum output of the engine.

4. The control apparatus according to claim 3, wherein the electronic control unit is configured to, when the N speed is established, execute the first downshift when the quantity of state of the vehicle is in the first region, and a difference between an estimated value of vehicle driving force when the speed is changed to the N−2 speed and an estimated value of vehicle driving force when the speed is changed to the N−1 speed is less than a predetermined value, after the quantity of state of the vehicle has risen above the N−1 speed downshift line.

5. The control apparatus according to claim 3, wherein the electronic control unit is configured to maintain the current N speed until a period of time for which the quantity of state of the vehicle is maintained in a second region exceeds a predetermined period of time when the N speed is established and the quantity of state of the vehicle is in the second region after the quantity of state of the vehicle has risen above the N−1 speed downshift line, the second region is a region that is below the hysteresis line and below the maximum N−1 speed downshift line, and
    the electronic control unit is configured to execute a second downshift that changes the speed from the N speed to the N−1 speed when the period of time for which the quantity of state of the vehicle is maintained in the second region exceeds the predetermined period of time.

6. The control apparatus according to claim 3, wherein the electronic control unit is configured to, when the N speed is established and the quantity of state of the vehicle is in a second region that is below the hysteresis line and below the maximum N−1 speed downshift line, after the quantity of state of the vehicle has risen above the N−1 speed downshift line, maintain the current N speed when an increase rate of an accelerator operation amount is smaller than a predetermined rate, and
    the electronic control unit is configured to execute the first downshift when the increase rate of the accelerator operation amount is greater than the predetermined rate.

7. The control apparatus according to claim 6, wherein the electronic control unit is configured to, when the N speed is established and the quantity of state of the vehicle is in the second region, after the quantity of state of the vehicle has risen above the N−1 speed downshift line, maintain the current N speed when a period of time for which the quantity of state of the vehicle is maintained in the second region has not exceeded the predetermined period of time and the increase rate of the accelerator operation amount is smaller than the predetermined rate, the electronic control unit is configured to execute the first downshift when the period of time for which the quantity of state of the vehicle is maintained in the second region has not exceeded the predetermined period of time and the increase rate of the accelerator operation amount is greater than the predetermined rate, and the electronic control unit is configured to execute a second downshift that changes the speed from the N speed to the N−1 speed when the period of time for which the quantity of state of the vehicle is maintained in the second region exceeds the predetermined period of time.

8. A control method for an automatic transmission, the automatic transmission including a plurality of speeds, the automatic transmission being configured such that any one of the plurality of speeds is selectively established, the automatic transmission being mounted on a vehicle, the control method comprising:

storing a plurality of shift lines, the plurality of shift lines including an N−1 speed downshift line, an N−2 speed downshift line, an N−1 speed upshift line, and a hysteresis line, and N is a natural number of 3 or higher, the N−1 speed downshift line being a shift line used to determine whether to change from an N speed to an N−1 speed, the N−2 speed downshift line being a shift line used to determine whether to change from the N−1 speed to an N−2 speed, the N−1 speed upshift line being a shift line used to determine whether to change from the N−2 speed to the N−1 speed, and the hysteresis line being a line that is a predetermined distance above the N−1 speed upshift line, and the hysteresis line being below the N−2 speed downshift line;

controlling the speed of the automatic transmission based on a quantity of state of the vehicle, and the plurality of stored shift lines; and executing a first downshift that changes a speed from the N speed to the N−2 speed, when the N speed is established and the quantity of state of the vehicle is in a region above the hysteresis line after the quantity of state of the vehicle has risen above the N−1 speed downshift line.

* * * * *